United States Patent [19]
Schnell

[11] Patent Number: 5,697,627
[45] Date of Patent: Dec. 16, 1997

[54] VEHICLE WITH THRUST CRANK DRIVE

[76] Inventor: Thomas Schnell, Hauptstrasse 47, D-25469 Halstenbek, Germany

[21] Appl. No.: 432,794

[22] Filed: May 2, 1995

[30] Foreign Application Priority Data

May 5, 1994 [DE] Germany ................... 9407488 U

[51] Int. Cl.$^6$ ..................................... B62M 1/04
[52] U.S. Cl. ................. 280/221; 280/257; 192/55.1; 192/64
[58] Field of Search ................. 280/252, 256, 280/257, 260, 221, 220; 192/55.1, 64

[56] References Cited

U.S. PATENT DOCUMENTS

| | | | |
|---|---|---|---|
| 1,190,089 | 7/1916 | Bellairs | 280/221 |
| 1,977,035 | 10/1934 | Benjamin | 280/257 |
| 1,998,293 | 4/1935 | Sweany | 208/34 |
| 2,164,870 | 7/1939 | De Salardi | 64/29 |
| 5,163,696 | 11/1992 | Pesco | 280/221 |
| 5,224,724 | 7/1993 | Greenwood | 280/221 |
| 5,405,157 | 4/1995 | Bezerra | 280/257 |

FOREIGN PATENT DOCUMENTS

| | | |
|---|---|---|
| 438953 | 6/1912 | France . |
| 613129 | 11/1926 | France . |
| 882633 | 6/1943 | France . |
| 164197 | 7/1904 | Germany . |
| 1194654 | 6/1965 | Germany . |
| 2743310 | 6/1978 | Germany . |
| 3508579 | 9/1986 | Germany . |
| 227063 | 9/1943 | Switzerland . |
| 363937 | 12/1931 | United Kingdom . |
| 733344 | 7/1955 | United Kingdom . |
| 2127111 | 4/1984 | United Kingdom . |

*Primary Examiner*—Anne Marie Boehler
*Attorney, Agent, or Firm*—McCormick, Paulding & Huber

[57] ABSTRACT

In order to provide a vehicle with a driven wheel (30), which possesses an external wheel hub (23) and is driven with the aid of a thrust crank drive which, while easily and safely operable, is at the same time able to achieve a high terminal velocity and which is simple in the construction of the drive arrangement, the thrust crank drive comprises a crankwheel (38) and a thrust rod (37) rotatably hinged with one end to the crankwheel (38) outside the wheel axis for the transmission of the force. The driven wheel (30) is driven by means of a drive wheel (7) which, via a free-wheel mechanism (11,12, 13,14,19), is in operative connection with the external wheel hub (23) of the driven wheel (30). A first mechanism (36) is provided which transmits the force between the crankwheel (38) and the drive wheel (7) and, for overcoming the dead center, a second mechanism is provided in the thrust crank drive which at least partially neutralizes the effect of the free-wheel mechanism (11,12,13,14,19).

4 Claims, 4 Drawing Sheets

VEHICLE WITH THRUST CRANK DRIVE

The present invention relates to a vehicle with a driven wheel possessing an external wheel hub and driven with the aid of a thrust crack drive.

BACKGROUND OF THE INVENTION

Vehicles of this type are known by way of example in the form of wheelchairs with thrust crank drive from the state of the art. In the known vehicles (wheelchairs), the thrust rod of the thrust crank drive is normally hinged direct onto one of the lateral wheels. That is why the thrust crank drive corotates constantly while the vehicle is travelling. On the one hand this offers the advantage that, when the vehicle stops, the crank drive only rarely comes to rest in its top or bottom dead center and, therefore, can also be used again without difficulty for starting. However, on the other hand, this entails the disadvantage that the corotating crank drive, when realeased, may easily lead to injuries and can be sized again only with difficulty.

Furthermore, in the area of scooters operated by physical effort, a rocking roller (of Messrs. Wittkop & Co., Bielefeld) is known from the thirties, in which a spur rack rotatably hinged to a rocker, acts as a thrust rod upon a gear wheel supported on the rear wheel axle, which is operatively connected with the rear wheel by means of a free-wheel mechanism. A moment of force is generated during the downward movement of the rocker, which is translated by means of the thrust rod lever ratio and transmitted by means of the thrust rod to the driving wheel on the rear wheel. In order to generate fresh drive energy, the rocker, in a non-powered upward movement, is brought into the initial position, which is made possible by means of the integrated free-wheel mechanism. In this solution it is unfavorable that it is only possible to utilize the downward movement of the rocker for the locomotion of the vehicle, a circumstance which limits the achievable velocity.

That is why it is the technical problem of the invention to provide a vehicle which possesses a thrust crank drive which, while being easily and safely operable, is at the same time able to reach a high terminal velocity and whose drive means are of simple construction.

SUMMARY OF THE INVENTION

This technical problem is resolved by the features characterized in the disclosure.

In this connection the central idea consists in that the thrust crank drive comprises a crankwheel and a thrust rod rotatably hinged outside the wheel axis for transmitting the driving force, in that the driven wheel is driven by means of a driving wheel which is operatively connected with the external wheel hub of the driven wheel via a free-wheel mechanism, in that first means are provided which transmit the force between the crankwheel and the driving wheel and in that, in order to overcome the dead center in the thrust crank drive, second means are provided which at least partially neutralize the effect of the free-wheel mechanism.

The essence of the invention is a thrust crank drive provided with a free-wheel mechanism which additionally comprises means that neutralize at least in part the effect of the free-wheel mechanism under certain conditions. The thrust crank drive with thrust rod and crankwheel ensures that it is possible for the force to be transmitted during the entire rotation, i.e. during the reciprocal motion of the thrust rod, to the driven wheel. The free-wheel mechanism ensures that, as a rule, the thrust crank drive does not corotate when the vehicle moves in a non-powered fashion. Finally, means for the partial neutralization of the free-wheel mechanism ensure that, under certain conditions, the thrust crank drive can be corotated by the travelling vehicle, that is to say just in the case when the drive, at the recommencement of the force transmission, disadvantageously happens to be in the top or the bottom dead center position.

According to first preferred embodiment of the vehicle according to the invention, the second means are constructed in the form of a slipping clutch, more particularly in the form of a spherical slipping clutch, between the drive wheel and the external wheel hub of the driven wheel.

A further development of this embodiment is characterized in that the external wheel hub of the drive wheel, in conjunction with a drive wheel retainer, is located opposite in the direction of the axle with two circular clutch surfaces and in that, in the clutch surface of the drive wheel retainer, a plurality of pressure spheres springably supported in the axle direction are provided which, in the non-loaded state, project partly from the clutch surface of the drive wheel retainer and lockingly engage into pertinent recesses in the clutch surface of the external wheel hub and in this way bring about that the drive wheel retainer is slaved by the external hub and which, in the loaded state, disappear into the clutch surface of the drive wheel retainer and thus effect a rotary motion of the external wheel hub relative to the drive wheel retainer.

A further preferred embodiment of the vehicle according to the invention is characterized in that the vehicle is constructed in the form of a scooter which, besides the drive wheel, comprises at least one further wheel, said wheels being rotatably supported in a frame, in that, on the frame, a rocker bearing is mounted, in which a rocker is swivellably supported and in that the thrust rod is swivellably hinged with its other end to one end of the rocker.

BRIEF DESCRIPTION OF THE DRAWINGS

In the following the invention will be explained in greater detail with the aid of embodiment examples in connection with the figures. Thus

DETAILED DESCRIPTION OF THE PREFERRED EMBODIMENT

Figure 2:
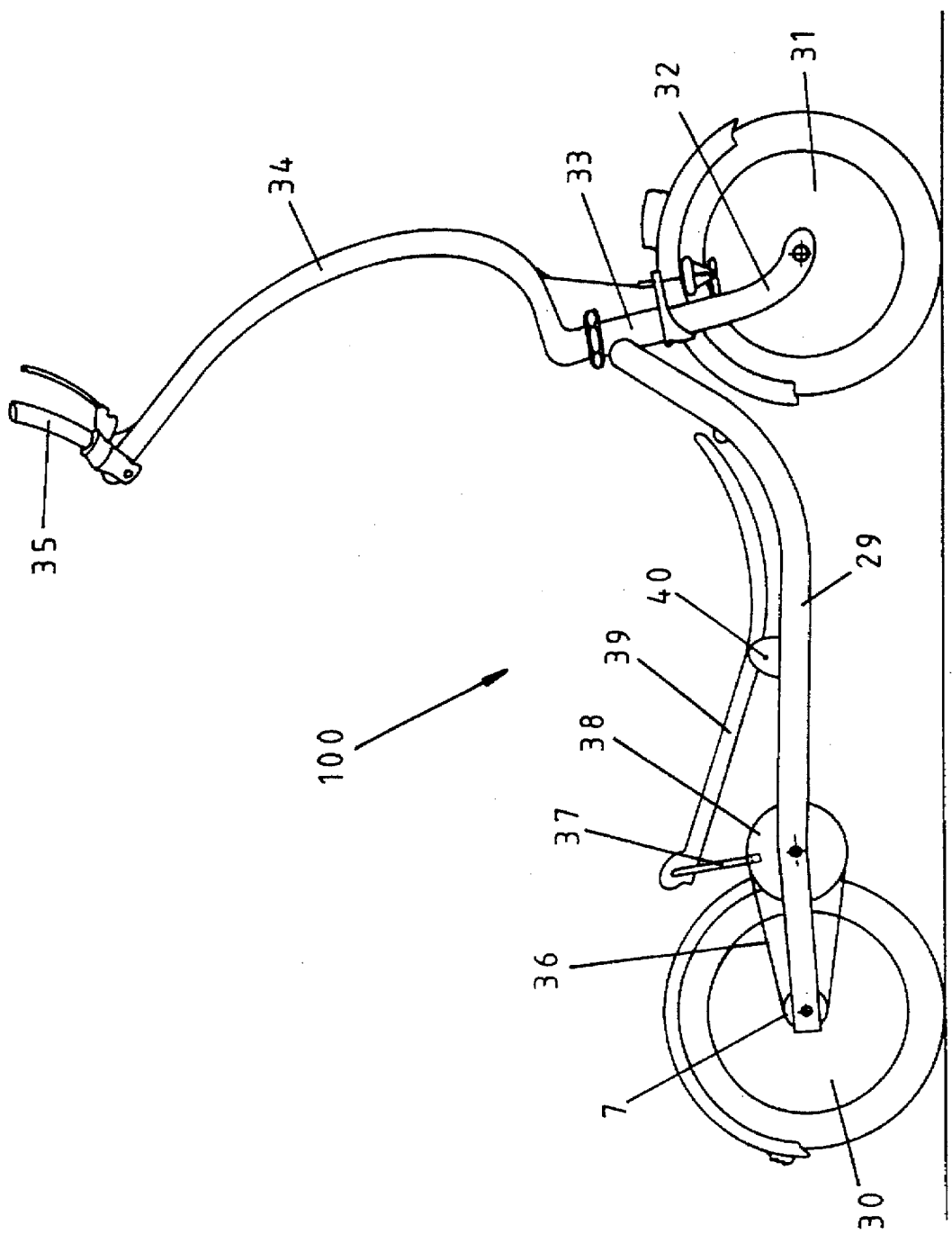
FIG. 2 shows the side view of a scooter with a thrust crank drive actuated by a rocker according to the invention.

In the following the thrust crank drive of the invention will be explained without any restriction of the general nature of the invention with the aid of the example of scooter that is movable in the forward direction by means of the feet, as can be seen in FIG. 2 in the side view.

The scooter 100 comprises a frame 29 constructed in a manner known per se, which bifurcates at the rear end and accommodates a driven wheel 30 in the fork. On the axle of the driven wheel 30, a drive wheel 7 in the form of a (small) gear wheel or pinion is mounted at the same time which, by means of a chain 36, is frictionally connected with a crankwheel 38 (front gear wheel) rotatably supported further in front on the frame 29. The drive wheel 7 is coupled to the driven wheel 30 by means of a (non-visible) free-wheel mechanism. Outside the axis of rotation of the crankwheel 38, a thrust rod 37 is rotatably hinged onto the same with one of its ends. With its other end, the thrust rod 37 is swivellably hinged onto the rear end of a rocker 39. The rocker 39 which, at the same time serves as running board, is supported in a rocker bearing 40, which is mounted on the top side of the frame center portion.

On the front end, the frame 29 passes into a fork bearing 33, wherein a front wheel fork 32 is rotatably supported in a known manner. The front wheel fork 32 accommodates a front wheel 31 below. Above it merges into a projecting portion 34 of the handle bar which, on its upper end, carries a handle bar 35. In addition, rim brakes, a lighting system and other general safety means may be provided.

Figure 3:
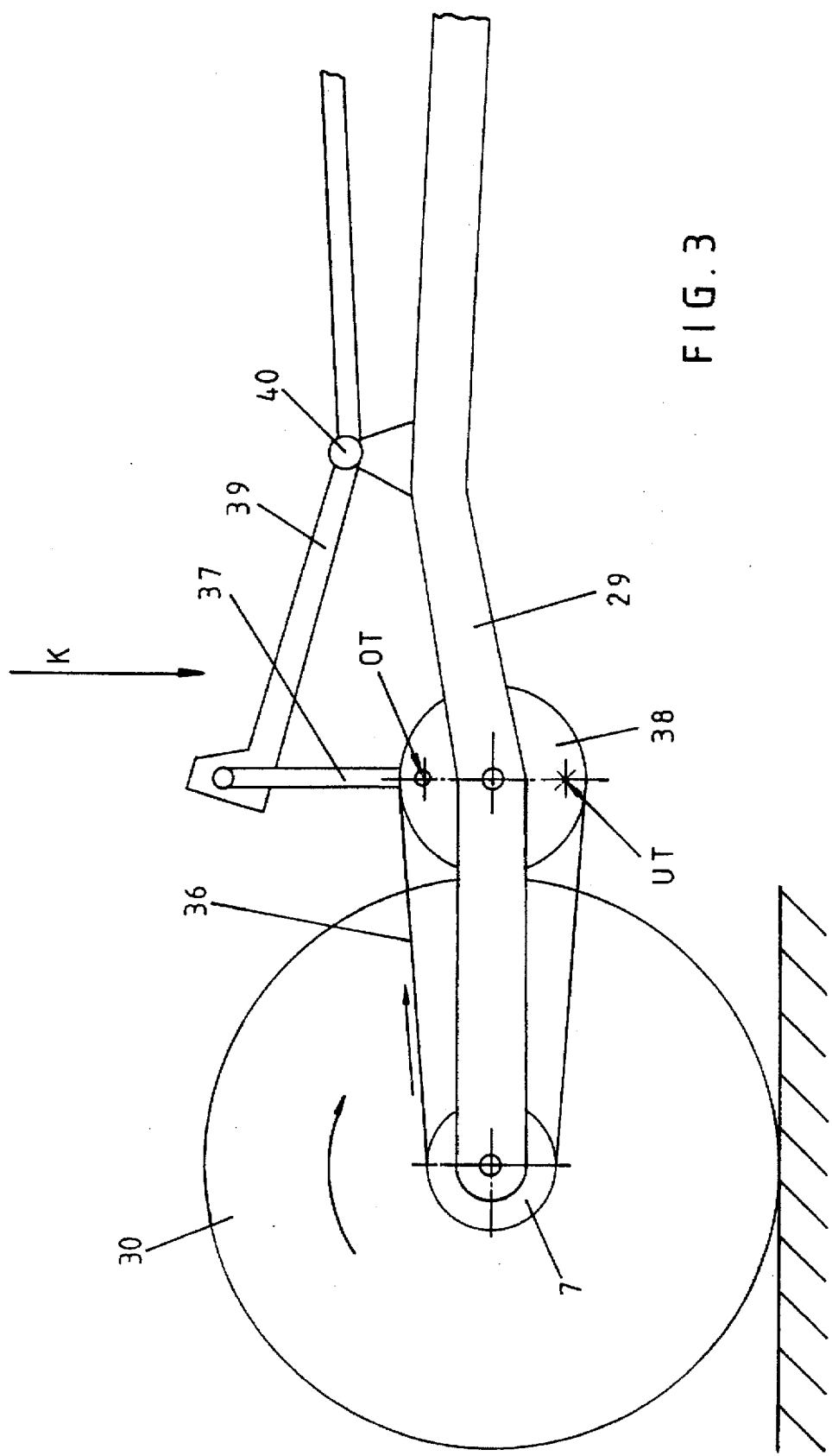
FIG. 3 shows the enlarged detail of the thrust crank drive of FIG. 2 for explaining the problematic nature of the dead center.

In FIG. 3, the thrust crank drive of FIG. 2 is once more depicted enlarged and in a schematized form for explaining the operational characteristics. Drawn in and marked with arrows are here two marked-out points of the thrust crank drive, viz. the top dead center OT and the bottom dead center UT. If the crankwheel 38 and the thrust rod 37 are in one of these two dead centers, a transmission of force from the rocker 39 to the drive wheel is not possible for geometric reasons since the (extended) force vector passes through the axis of rotation of the crankwheel 38 directly and the torque is zero. Consequently, if in such a case it is intended to transmit driving force from the rocker 39 to the rear wheel 30, it will first of all have to be ensured that the thrust crank drive 37, 38 is moved out of its dead center. As soon as the dead center OT or UT is left, a torque other than zero results on the crankwheel 38, which is transmitted via the chain 36 to the drive wheel 7 and drives the rear wheel.

If the drive wheel 7 were not coupled to the driven wheel 30 by means of a free-wheel mechanism, it would be possible to use the motion or the momentum of the wheel 30 for moving the thrust crank drive 37, 38 out of its dead center. However, due to the incorporated free-wheel mechanism this is prevented for the moment. But, according to the invention, means are provided which at least partially neutralize the effect of the free-wheel mechanism. By preference, these means comprise a slipping clutch, more particularly in the form of a spherical slipping clutch, which is provided between the drive wheel 7 and the driven wheel 30.

The slipping clutch has the following effect: In the course of the travel, by means of a frictional connection of drive wheel 7 and rear wheel 30, with the aid of the slipping clutch, the rotatory energy of the travelling system is utilized in order to overcome the dead centers of the thrust crank drive.

When travelling without rocker force support, by the combination of the spherical slipping clutch and free-wheel mechanism, the frictional connection is disengaged and the standstill of the rocker 39 made possible. If one wishes to once again supply the system with energy, a further slight relief of the force transmission means (rocker) suffices and the available rotatory energy of the movement transmitted by the engagement of the spring-loaded pressure spheres or balls (15 in FIG. 1) into the pressure regulating plate (17 in FIG. 1) in a frictional connection onto the thrust crank drive. The thrust rod 37 of the thrust crank drive is thereby drawn out of its dead center and the continuation of the force transmission can take place.

The coupling of the drive wheel 7 and of the rear wheel 30 via the spherical slipping clutch (FIG. 1) makes a constant restarting of the force transmission means (rocker) possible. It is thus possible to supply the system with energy as often as one wishes to since the thrust crank drive can at all times be drawn out again of the dead center position occurring when the force transmission is stopped by means of the aforementioned frictional connection (slipping clutch).

Figure 1:
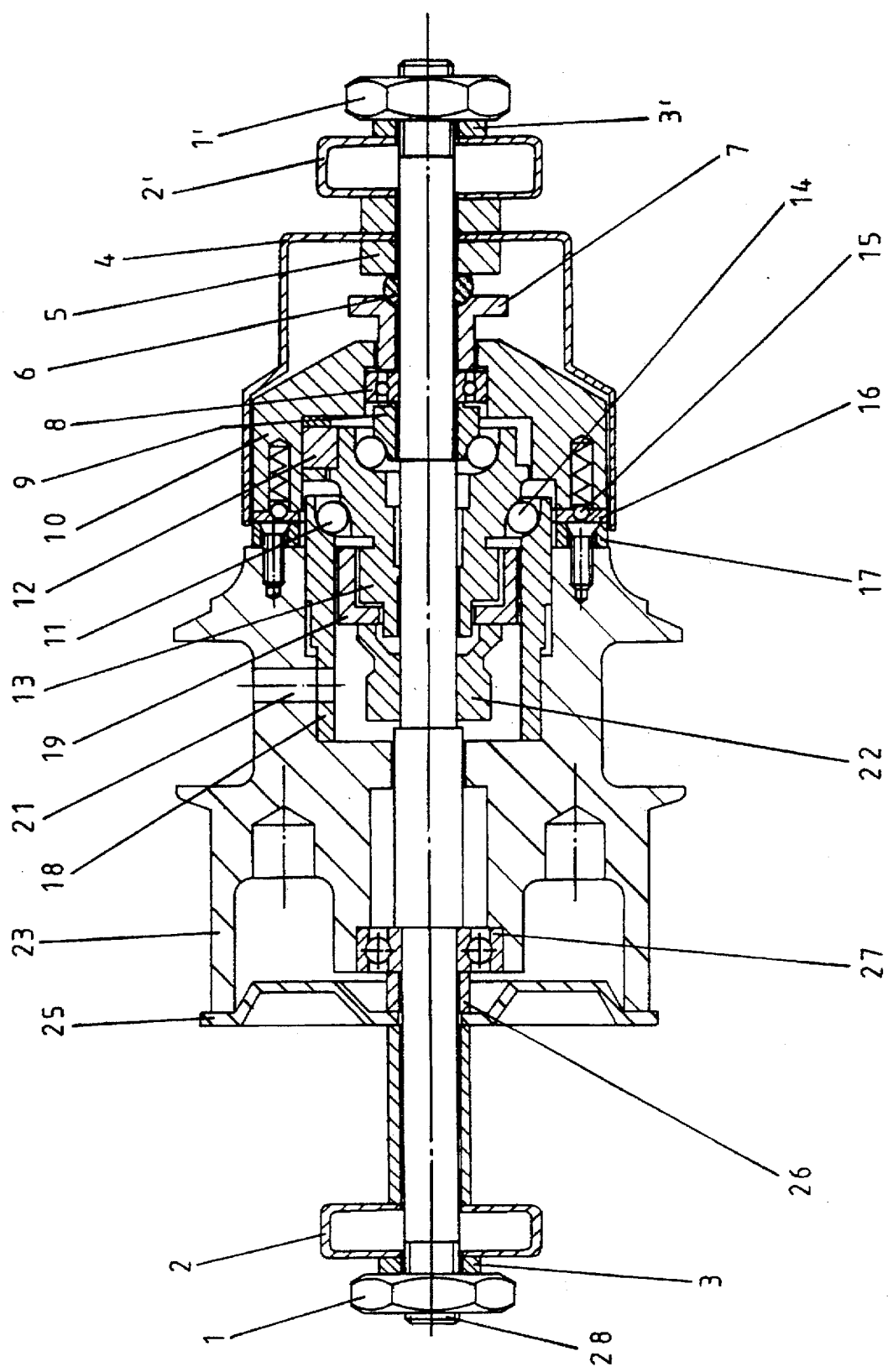
FIG. 1 shows in a longitudinal section a preferred embodiment example of a complete wheel hub with free-wheel mechanism and spherical slipping clutch as is particularly suited for realizing the invention.

A preferred embodiment example of a rear wheel hub with a free-wheel mechanism and spherical slipping clutch which is based upon a conventional free-wheel hub is depicted in a longitudinal section in FIG. 1. The hub comprises an axle shaft 28 secured by means of nuts 1, 1' and washers 3, 3' in the bifurcated frame tubes 2, 2' of the frame 29, on which an external wheel hub 23 is rotatably supported with the aid of a grooved ball bearing 27 and pertinent spacer sleeves 26. On the left-hand side of the external wheel hub 23, a drum brake anchor 25 is disposed.

On the right-hand side of the external wheel hub 23, those elements are disposed which together form both the free-wheel mechanism as well as the spherical slipping clutch. The drive wheel 7, which is constructed in the form of a gear wheel, is welded together with a drive wheel retainer 10 which, on the left-hand side, with a circular clutch surface oriented in the direction of the axle, is located opposite a matching clutch surface on the external wheel hub 23. In the clutch surface of the drive wheel retainer 10, in the direction of the axle, a plurality of blind end bores are provided in a circle-like disposition which, in each case, accommodate spring-supported pressure spheres 15. The pressure spheres 15 are held back against the spring pressure with the aid of a pressure plate 16 in the blind-end holes, in which case they project with a portion of their sphere volume from the pressure plate 16, a pressure retaining plate 17 with matching recesses secured to the external wheel hub 23 is located, into which the pressure spheres 15 are able to lockably engage in a pertinent position. The drive wheel retainer 10 is supported with the aid of a further grooved ball bearing 8 on the axle shaft 28. On the right-hand side of the drive wheel 7, a thrust bearing 6 of polycarbonate is disposed. Drive wheel 7 and drive wheel retainer 10 are surrounded by a protective covering which prevents a contamination and is secured to the axle shaft 28 with the aid of spacer disks 5.

The drive wheel retainer 10 and the external wheel hub 23 form a hollow space between them in which the free-wheel mechanism is housed. The free-wheel mechanism comprises an internal wheel hub 18 which, by means of clamping pegs in transversal bores 21, is rigidly connected to the external wheel hub, a back-pedalling arresting means 22, a free-wheel cage 19, two free-wheel bearings 11 and 14, a free-wheel member 13, check bolts 12 and a bearing retainer 9. In construction and operation, the free-wheel mechanism corresponds to the known free-wheel mechanisms, for which reason a more detailed description can be dispensed with here. The mode of operation of the spherical slipping clutch 10, 15, 16, 17 results clearly from the FIG. 1.

Figure 4:
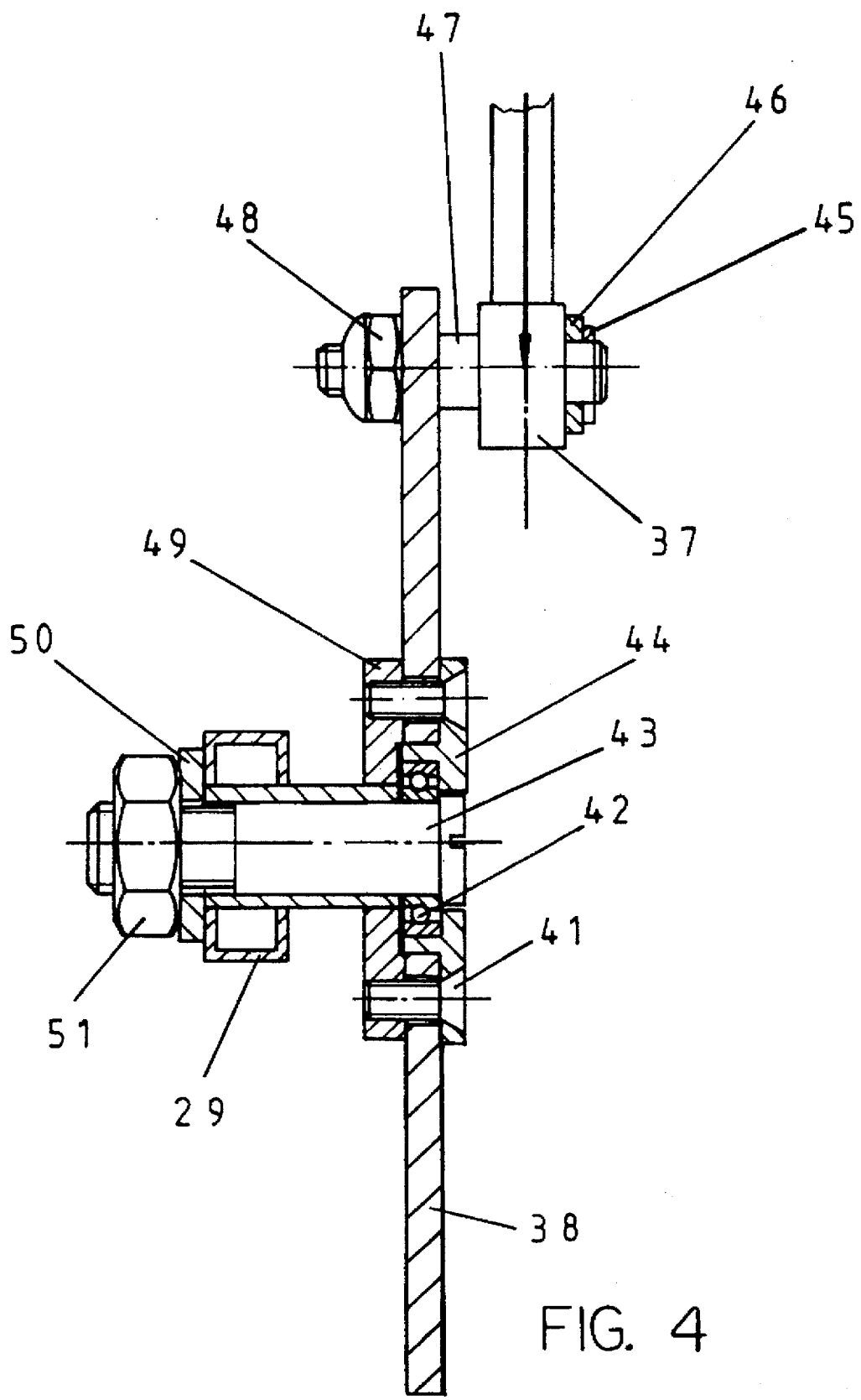
FIG. 4 shows in a longitudinal section an embodiment of a mounting of the crankwheel (front gear wheel) in a thrust crank drive according to the invention.

The construction and the mounting of the crankwheel (front gear wheel) 38 (FIG. 2) is preferably effected according to the embodiment example depicted in FIG. 4. In the frame 29, the crankwheel 38 is mounted with the aid of a bearing pin 43, a thrust washer 50, a lock nut 51, a grooved ball bearing 42 and two bearing covers 44 and 49 screwed on by means of hexagonal socket screws 41. Further outward, the thrust rod 37 is rotatably hinged to the crankwheel with the aid of thrust rod pins 47, lock nut 48, washer 46 and retaining ring 45.

Although the invention has been explained in the foregoing with the aid of a rocker-actuated scooter, its application with wheelchairs or other systems which are equipped with a thrust crank drive operated by physical strength or by mechanical means and are intended to be operated without a mechanical disconnecting clutch, is of course possible. In such a case, a more elevated achievable speed is advantageous as well as a special constructional simplicity (more particularly in the rocker construction) and a great operational safety (small risk of accidents).

Provision may also be made for the drive wheel 7 to be connected with the driven wheel 30 by means of a hub gear change.

LIST OF REFERENCE NUMBERS 1, 1' nut
2, 2' frame tube
3, 3' washer
4 protective cover
5 spacer disks
6 thrust bearing
7 drive wheel (rear gear wheel)
8 grooved ball bearing
9 bearing retainer
10 drive wheel support
11 free-wheel bearing (shaft bearing)
12 check bolt
13 free-wheel member
14 free-wheel bearing (hub bearing)
15 pressure sphere (free-wheel delay)
16 pressure plate (for pressure spheres)
17 pressure retaining plate
18 internal wheel hub
19 free-wheel cage
21 transversal bore
22 back-pedalling arresting means
23 external wheel hub
25 drum brake anchor
26 spacer sleeve
27 grooved ball bearing
28 axle shaft
29 frame
30 driven wheel (rear wheel)
31 front wheel
32 front wheel fork
33 fork bearing
34 projecting handle bar portion

LIST OF REFERENCE NUMBERS 35 handle bar
36 chain
37 thrust rod
38 crankwheel (front gear wheel)
39 rocker
40 rocker bearing
41 hexagonal socket screw
42 grooved ball bearing
43 bearing pin
44 bearing cover
45 retaining ring
46 washer
47 thrust rod bolt/pin
48 lock nut
49 bearing cover
50 thrust washer
51 lock nut
100 scooter
OT top dead center
UT bottom dead center

What is claimed is:

1. Vehicle with a driven wheel (30), which possesses an external wheel hub (23) and is driven with the aid of a thrust crank drive, characterized in that the thrust crank drive comprises a crankwheel (38) and a thrust rod (37) rotatably hinged outside the wheel axis with one of its ends onto the crankwheel (38) for the transmission of the driving force, in that the driven wheel (30) is driven by means of a drive wheel (7) which is in operative connection with the external wheel hub (23) of the driven wheel (30) via a free-wheel mechanism (11, 12, 13, 14, 19), in that first means (36) are provided which transmit the force between the crankwheel (38) and the drive wheel (7) and in that, for overcoming the dead center, second means are provided with the thrust crank drive which during free wheeling operation of said vehicle at least partially neutralize the effect of the free-wheel mechanism (11, 12, 13, 14, 19), said free-wheel mechanism including two annular parts (16) and (17) having two axially opposed clutch faces which opposed clutch faces engage one another and rotate in unison when power is transmitted from said crank wheel (38) to said driven wheel (30) and which two opposed faces are spaced from one another during free-wheel operation, and said second means including at least one spherical ball (15) carried by one of said annular parts and biased axially toward said other of said annular parts, which ball engages the other of said annular parts during freewheel operation.

2. Vehicle according to claim 1, characterized in that the external wheel hub (23) of the driven wheel (30) is rotatably mounted on an axle shaft (28), a drive wheel retainer (10) is rotatably mounted next to the external wheel hub (23) on the axle shaft (28), while the external wheel hub (23) and the drive wheel retainer (10) are located opposite each other in the direction of the axle and respectively carry said annular parts (17 and 16), said at least one spherical ball being one of a plurality of balls (15) springably supported in the direction of the axle by the retainer (10) and which, in the non-loaded state, project partially from the clutch surface of the drive wheel retainer (10) and engage into pertinent recesses in the clutch surface of the external wheel hub (23) and thus bring about a slaving of the drive wheel retainer (10) to the external wheel hub (23) and which balls, in the loaded state, disappear into the clutch surface of the drive wheel retainer (10).

3. Vehicle according to claim 2, characterized in that the drive wheel (7) and the crankwheel (38) are constructed in the form of gear wheels and in that the first means (36) comprise a chain or a toothed belt.

4. Vehicle according to claim 1, characterized in that the vehicle is constructed in the form of a scooter (100) which, apart from the driven wheel (30), comprises at least one further wheel (31), said wheels being rotatably supported in a frame (29), in that, to the frame (29), a rocker bearing (40) is fitted, wherein a rocker (39) is swivellably supported and in that the thrust rod (37), with its other end, is swivellably hinged onto one end of the rocker (39).

* * * * *